June 21, 1949.  C. H. SCHLESMAN  2,474,192
ELECTRONIC CURVE PLOTTING DEVICE
Filed April 25, 1944  4 Sheets-Sheet 1

Fig.1,

INVENTOR.
CARLETON H. SCHLESMAN
BY James Y. Cleveland
ATTORNEY.

June 21, 1949.　　　C. H. SCHLESMAN　　　2,474,192
ELECTRONIC CURVE PLOTTING DEVICE
Filed April 25, 1944　　　　　　　　　　　　4 Sheets-Sheet 2

INVENTOR.
CARLETON H. SCHLESMAN
BY James Y. Cleveland
ATTORNEY.

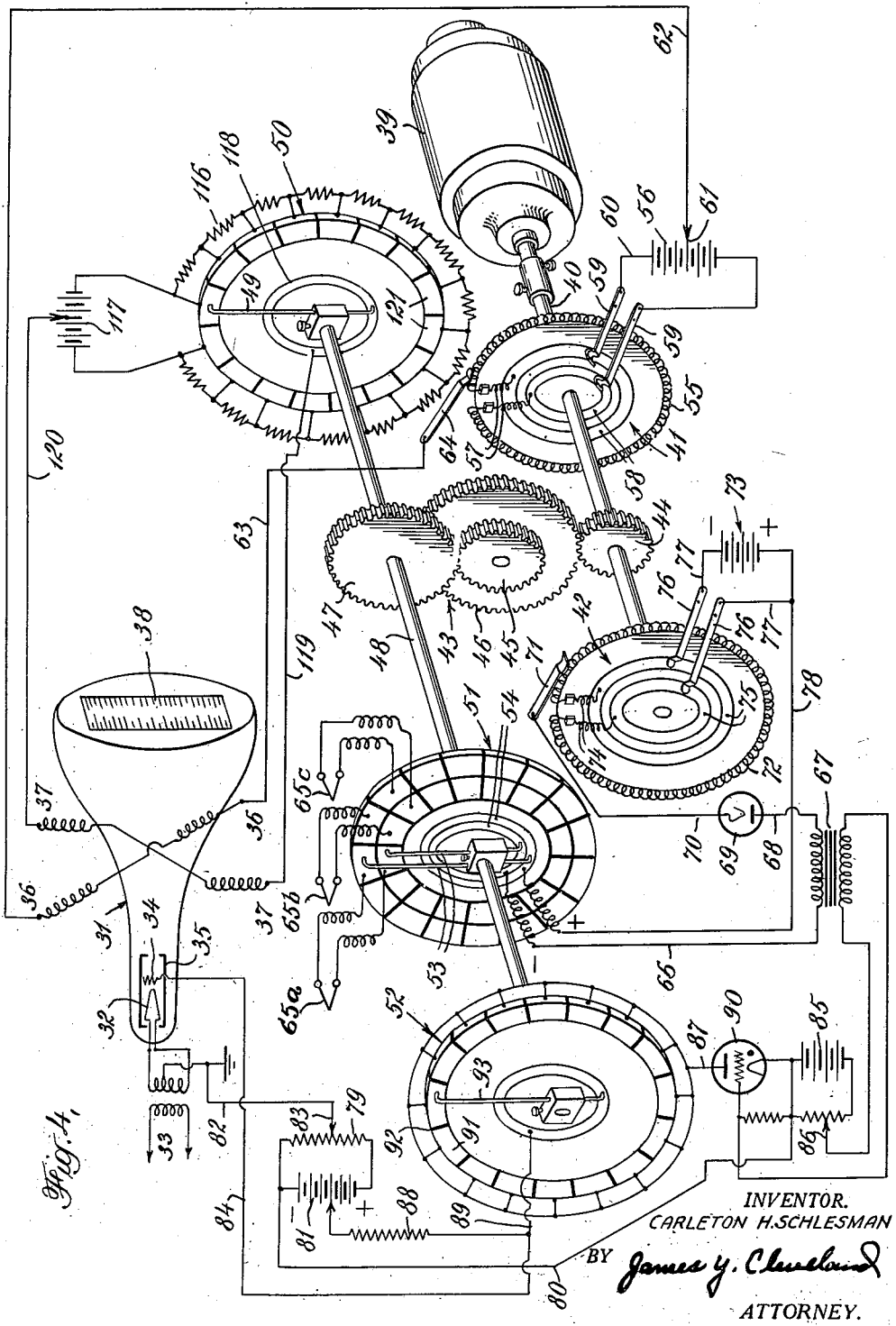

June 21, 1949.  C. H. SCHLESMAN  2,474,192
ELECTRONIC CURVE PLOTTING DEVICE
Filed April 25, 1944  4 Sheets—Sheet 4
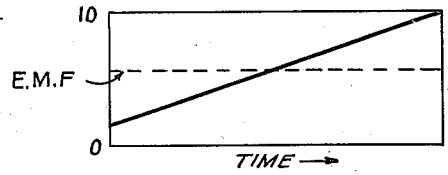
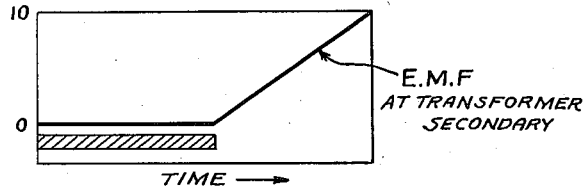
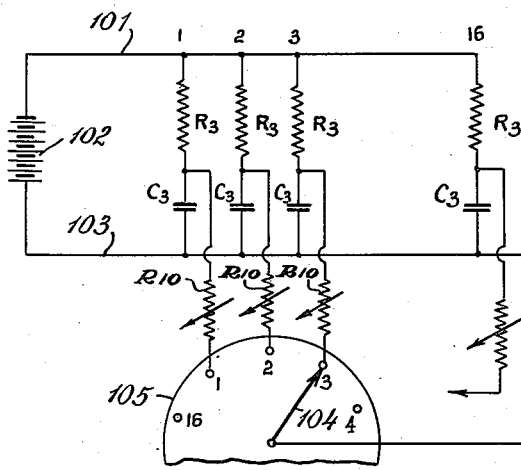
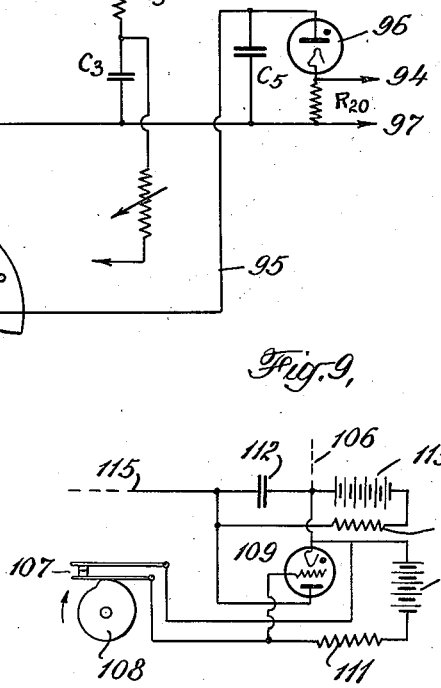
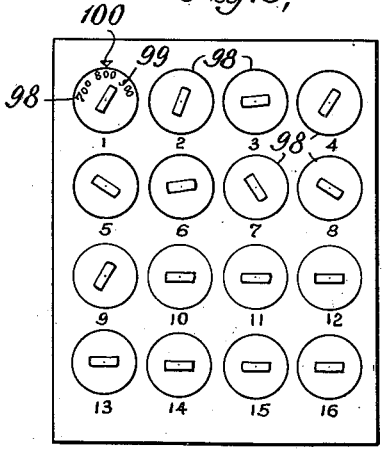
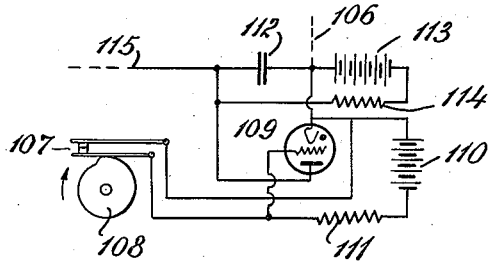
INVENTOR.
CARLETON H. SCHLESMAN
BY James Y. Cleveland
ATTORNEY.

Patented June 21, 1949

2,474,192

UNITED STATES PATENT OFFICE 2,474,192

ELECTRONIC CURVE PLOTTING DEVICE

Carleton H. Schlesman, Camden, N. J., assignor to Socony-Vacuum Oil Company, Incorporated, a corporation of New York Application April 25, 1944, Serial No. 532,686

7 Claims. (Cl. 73—341)

This invention relates generally to graphic indicating devices and more particularly to indicating devices for keeping the operator of continuous processing equipment informed of the conditions of the equipment.

In the operation of modern continuous processing equipment, the success of the entire process depends upon continually keeping operations in step with respect to various variables, such as, temperature, velocity or time; for example, any slow down of one end of a unit timing would seriously upset the operation of other parts of the unit.

This condition has been encountered in the prior art and met on commercial units by the installation of a multiplicity of recording instruments and indicators to permit the operating crew to keep informed of the conditions of a unit. Because of the speed with which changes occur in large installations, it is necessary to have some form of analyzing or indicating equipment to permit the operator to size up the situation at a single glance. It is the purpose of this invention to provide such equipment.

As an example, the operation of an indicator of this type as applied to a process for catalytic conversion of hydrocarbons will be described. Recently such a process has taken the form of a system wherein a particle form solid catalytic material is cyclically passed through a conversion zone wherein it is contacted with hydrocarbon vapors and a regeneration zone wherein it is contacted with a combustion supporting gas acting to burn off a contaminant deposited on the catalyst in the conversion zone. A commercially successful process of this type is the "Thermofor" catalytic cracking process.

In the operation of a "Thermofor" catalytic cracking unit, it is essential that the temperature vertically throughout the reactor and temperatures vertically and horizontally throughout the burners or regenerators be maintained at certain predetermined levels. With a multiplicity of burners or regenerators it is essential that the temperature groups in each burner be related. It is desirable at the same time to readjust temperature levels if the volume of charge passing through the unit is to increase, or if certain other conditions are to be met.

The temperature conditions throughout the reactor and regenerator are usually measured by means of thermocouples advantageously placed at different vertical levels throughout the height of the reactor or regenerator. These thermocouples are connected to separate recording and indicating circuits. It is not unusual to use as many as twenty separate thermocouples in a single reactor or regenerator which necessitates a like number of individual indicators for indicating the temperature registered by each thermocouple. During the operation of a "Thermofor" catalytic cracking unit it is necessary that the zone adjacent each thermocouple be kept within a narrow temperature range. Each zone may have a different temperature range, therefore, no two of the plurality of indicating devices, in the example used, twenty, when operating under the proper conditions, would necessarily read the same. Therefore, it is readily apparent that it is no small task for the operator of the unit to try to watch all of these indicators and at the same time make necessary adjustments to the unit to maintain the necessary conditions in all zones of the reactor or regenerator.

The present invention solves the problem for the operator by providing an indicator which will give persistently, in a single diagram, an indication of the conditions existing in all of the zones in the reactor or regenerator and at the same time compare these conditions to a characteristic curve that represents optimum operating conditions.

This invention also contemplates an indicator that not only will indicate on a single diagram the temperature conditions existing in each zone of the reactor or regenerator, but is capable of simultaneously indicating gradients of temperature between zones, space velocity, rate of charge, and numerous other conditions.

An operating characteristic curve once determined for a unit can be electronically or mechanically superimposed upon the diagram representing the operating conditions of the unit for purpose of immediately indicating any deviation from the desired conditions in any particular zone. This operating characteristic often changes for different operating levels.

U. S. Patent 2,085,203, in which this applicant is a joint inventor, describes a mosaic type of indicator. This indicator consists of an oscilloscope capable of plotting information in the form of curves or bar charts so rapidly that a changing temperature may be shown by a steadily moving bar chart. The instant invention utilizes the same fundamental principles as that disclosed in the patent, but is directed to apparatus which, when connected to existing thermocouples and commercial temperature measuring equipment through electronic devices, is capable of showing on a screen a continuous bar chart in which the horizontal axis may be temperature in degrees Fahrenheit (700°–1200°), and in which the vertical axis may be the position of the thermocouple plotted vertically with reference to height of the column and the burner. This same equipment provides for superimposing upon the screen a dotted line, for example, which would serve to indicate the desired operating positions, and further, might be so coupled to the feed system as to indicate the space velocity of the unit at the instant and to reset the indicated operating condition curve for altered space velocities.

The present invention is sufficiently flexible that a plurality of curves can be plotted on the same chart by bars of light, one or more reference lines can be superimposed by means of bright dots, wide bars of light can be plotted to represent certain variables, narrow bars for other variables, and saw-toothed or dotted lines still other variables.

The apparatus of the present invention is adapted for operating at high speeds; for example, plotting twenty or more separate temperatures within an elapsed time of one second. Certain modifications suggest themselves which will permit the apparatus to operate at considerably higher or considerably lower rates of speed.

Assuming, for example, a long persistent screen, so that the visual indications have a decay period ranging from one to ten seconds, depending upon the rate of scanning and the number of elements scanned, a mosaic diagram can be produced that will show continuously the operating conditions existing in the unit to which it is applied.

The present invention is directly applicable to "Thermofor" catalytic cracking units that have already been put into operation. The thermocouples on these units are brought out to thermal blocks where they divide between the indicators and the present recorders. A synchronized motor, driving a commutator or a series of cam-operated multiple switches similar to those employed with present recorders, serves to connect each thermocouple to the mosaic indicator for a brief instant of time. A shaft geared to the same synchronized motor carries a conventional commutator and slide wire, utilized in ordinary recorders, and a second similar slide wire with the necessary brushes, which serves to position the recording beam of the oscilloscope in a horizontal direction with respect to temperature. For example, the scale may be linear in degrees Fahrenheit or may be compressed at one end. The return of the indicating ray is scheduled to occur at the instant at which the next thermocouple is being selected so that any noise or disturbance does not appear on the screen.

Other features and applications of the present invention will be disclosed in the following detailed description and by the drawings, in which Figure 1 is a diagrammatic illustration of a "Thermofor" catalytic cracking operation;

Figure 4 is a schematic diagram, partly in perspective, showing the complete indicator forming the subject matter of this application;

Figure 5 is a graph of two curves that have been plotted with thermocouple electromotive force and equalizing voltage as ordinates and time as abscissa;

Figure 6 is a graph of a curve which has been plotted with length of light bar control voltage as ordinates and time as abscissa;

Figure 7 is an illustration of an electrical circuit by means of which a curve having predetermined characteristics can be simultaneously placed on the mosaic diagram with one indicating substantially instantaneous operating conditions;

Figure 8 is an illustration of a control panel for the circuit of Figure 7; and

Figure 9 is a diagram illustrating a modification of the present invention showing a saw-tooth oscillator for providing a sweep-voltage for the horizontal sweep coils and a bucking or equalizing voltage for the thermocouple voltage when extremely high speed scanning is desired.

Figure 1:
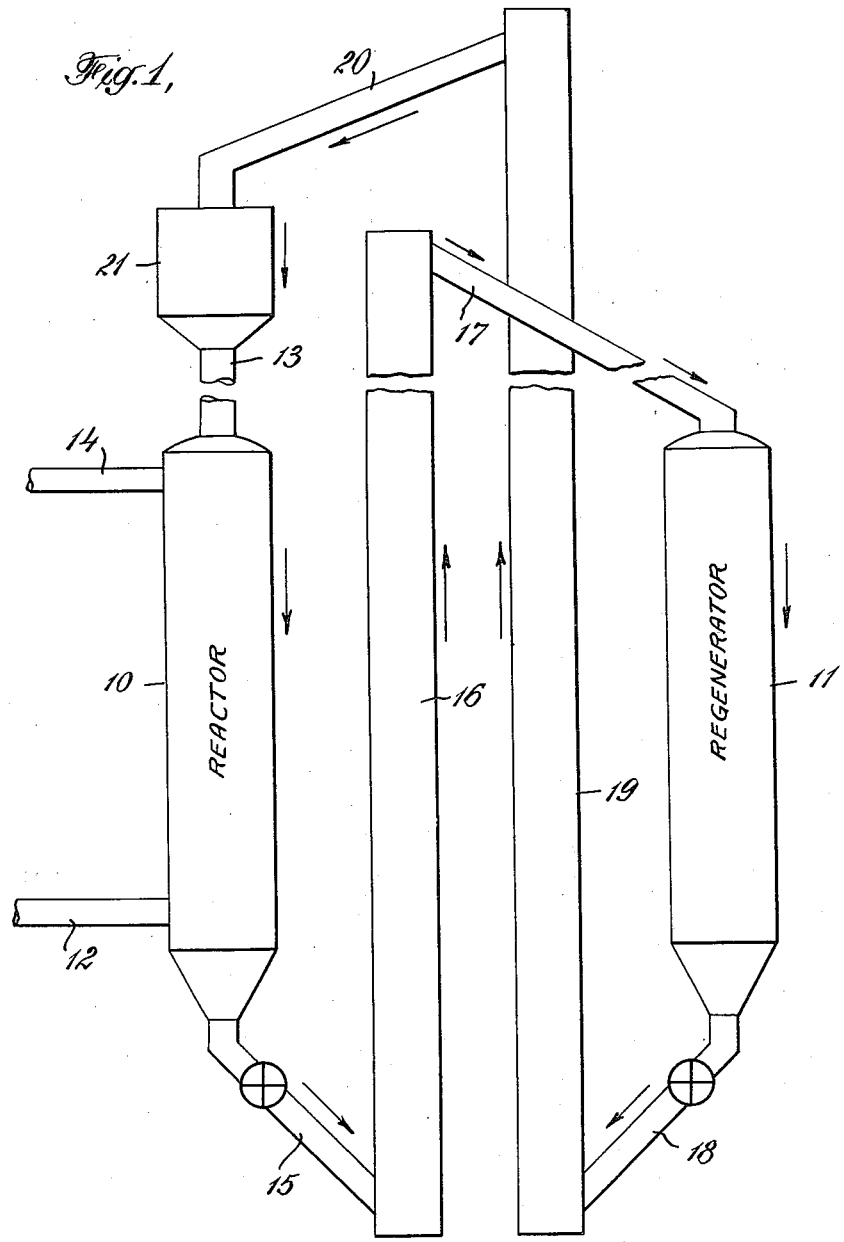

Referring to the drawings in detail, particularly Figure 1, there is shown diagrammatically a "Thermofor" catalytic cracking unit adapted for continuous operation comprising a reactor 10 and a regenerator or burner 11. Hydrocarbon gases to be cracked are fed into the reactor through an inlet pipe 12. These gases are introduced in countercurrent to the flow of catalyst, usually in pellet form, that is admitted through the inlet pipe 13. The cracked gases are drawn off by way of outlet 14 and are selectively passed on to other stages of the process not shown. The catalyst with pellets coated with coke passes out of the reactor at the bottom through an outlet pipe 15, through which it is fed to an elevator 16. Elevator 16 carries the catalyst up to an elevator discharge 17 through which it is fed by gravity directly into the regenerator or burner 11. The catalyst passes downwardly through the regenerator traversing a plurality of zones having controlled temperature where air is fed into the regenerator to burn off the coke deposited on the catalyst while passing through the reactor. Each zone traversed by the catalyst therefore has controlled heating and/or controlled cooling. The regenerated catalyst leaves the regenerator through the outlet 18 through which it is caused to flow into a second elevator 19 which raises the catalyst and dumps it through the elevator outlet 20 into a hopper 21. The hopper 21 feeds the catalyst back into the reactor at a controlled rate where it is again used for cracking the hydrocarbon gases. Since this cycle is continuous the need for a multiplicity of controls is apparent, and whenever a control is needed an indicator of the condition to be controlled must be used.

Figure 2:
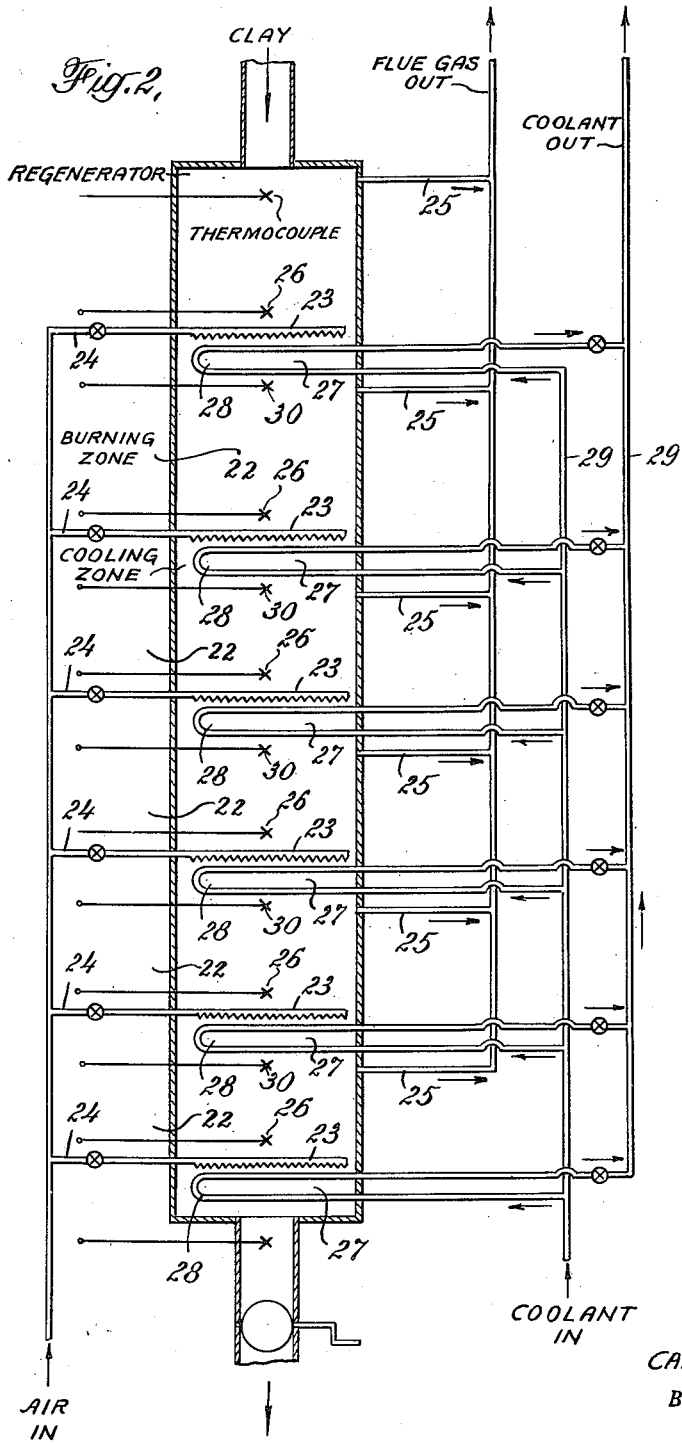
Figure 2 is a vertical section of a regenerator or burner unit showing the location of controlled temperature zones.

As an example of the many controls needed, Figure 2 shows a regenerator in vertical section having a plurality of burning zones 22 into which air is fed by means of tuyères 23 that are connected to supply pipes 24, for the purpose of burning the coke from the catalyst. The catalyst, having the coke deposited thereon, is fed into the regenerator by means of pipe 17 at a controlled rate at a temperature falling within the range of 700°–1200° F. The catalyst, by gravitational force, passes through the successive zones and out through the outlet 18. As the catalyst traverses each zone, the air admitted by the tuyères 23 causes a portion of the deposit carried by the catalyst to be burned off, thereby raising the temperature of the catalyst. The products of combustion escape through the outlets 25. If the temperature exceeds a certain critical temperature the catalyst will be ruined. Therefore, thermocouples 26 are inserted in each burning zone by means of which the temperature can be watched and controlled accordingly. There are interposed between the burning zones 22, cooling zones 27. Coolant is supplied to these zones by means of pipe coils 28 that are connected through suitable control valves to supply and outlet lines 29. As the catalyst with temperature raised passes each of the burning zones 22 it enters one of the cooling zones 27 where its temperature is brought down to a predetermined level. Thermocouples 30 are inserted in these cooling zones so that the amount of cooling in each zone can be watched and controlled. The catalyst, therefore, in traversing the regenerator 11, successively passes through alternate burning and cooling zones. It is not unusual to have as many as ten burning zones and as many cooling zones in a regenerator, each one having at least one thermocouple and associated indicator. No two of the indicators would necessarily read the same temperature, but they would bear an overall relationship. In addition to the twenty thermocouples required for the heating and cooling zones one is needed in the inlet to indicate the temperature of the catalyst as it enters the regenerator and one is needed in the outlet to indicate the temperature of the catalyst as it leaves. For the regenerator alone, by prior art methods, an instrument panel would be needed having as many as twenty-two indicators. As pointed out above it is no small job to watch twenty-two indicators and make the necessary adjustments at the same time to maintain the desired operating conditions in the regenerator. It is to a problem of this character that the instant invention has direct application.

Figure 3:
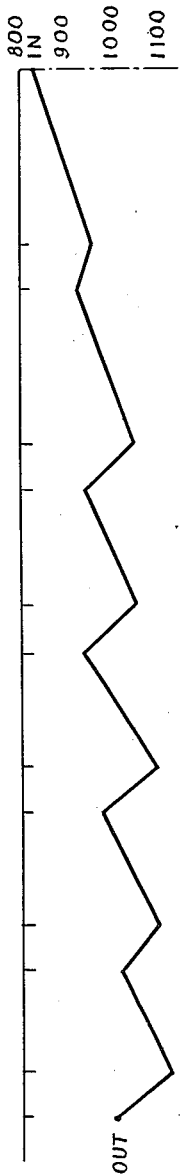
Figure 3 is a characteristic curve illustrating operating conditions in a "Thermofor" catalytic cracking regenerator which has been plotted with temperature as abscissa and position of thermocouples as ordinates.

If the desired thermocouple temperatures are plotted as abscissae against the position of the thermocouples as ordinates a characteristic curve representing the desired operating conditions will be obtained. Such a curve is illustrated in Figure 3. A curve of this character, in a manner to be described later, can be produced electronically on a screen and will serve as a reference curve for another which represents instantaneous operating conditions, that can be plotted electronically on the same screen.

In Figure 4 there is illustrated a system for plotting a curve on the screen of a cathode-ray tube which represents instantaneous operating conditions in the regenerator of a "Thermofor" catalytic cracking unit. The cathode-ray tube 31 is provided with conventional elements comprising a cathode 32, supplied with power by the transformer 33; anode 34 for controlling the intensity of the light ray; anode 35 for focusing the light ray, horizontal sweep coils 36; and vertical sweep coils 37. The screen 38 of the tube 31 is provided with coordinates that represent degrees Fahrenheit (700°–1200°) horizontally and position of thermocouple vertically. By the application of different voltages to the sweep coils 36 and 37 the spot of light produced by the cathode ray on the screen can be made to move over the coordinates at will. The potential placed on anode 34 will control the brightness and "on" and "off" of the ray, while that applied to anode 35 will focus the ray.

The curve traced by the cathode ray on the screen 38 of the cathode-ray tube 31 is controlled by the combination of elements in perspective and the associated electrical elements and circuits shown diagrammatically. A synchronized motor 39, through a shaft 40, drives potentiometers or slide wires 41 and 42. Shaft 40 through the gear train 43, comprising gears 44, 45, 46 and 47, drives a second shaft 48 at a reduced speed. For example, as the first shaft 40 rotates 1200 revolutions per minute, the second shaft 48 is driven through a 16 to 1 reduction gearing at 75 revolutions per minute. Shaft 48 carries at one end a selector 49 that contacts a commutator 50 for selecting the proper voltage that is to be supplied to the vertical sweep coils 37 of the cathode-ray tube 31. On the opposite side of the gear train 43 there are two other commutating discs 51 and 52 maintained in spaced relationship. The selector contacts 53 select on commutator disc 51 the thermocouple whose temperature it is desired to record while selector 93 completes a circuit through commutator 52 which is a circuit making and breaking commutator for controlling the current that limits the length of the light bar placed on the screen of the cathode-ray tube, to be described in detail hereafter.

Referring to the above-described elements in connection with the electrical circuits which they control, the voltage applied to the horizontal sweep coils 36 is governed by the potentiometer 41. The potentiometer 41 has opposite ends of its resistance element 55 connected to the terminals of battery 56 through the conductors 57, slip rings 58, brushes 59 and conductors 60. The circuit through the horizontal sweep coils 36 is completed from a variable center tap 61 on the battery 56 by conductors 62 and 63, and the sliding contactor 64. By making tap 61 variable the spot produced on the screen by the cathode ray can be positioned horizontally. As the synchronized motor 39 makes one complete revolution, the entire resistance 55, which is directly connected across the battery 56, is cut out by the sliding contactor 64 to cause the voltage applied to the horizontal sweep coils 36 to change from a predetermined negative value to a predetermined positive value. The variation in voltage causes the cathode-ray spot to move horizontally across the screen 38 of the cathode-ray tube 31. The distance that the cathode-ray spot will move horizontally across the tube is so controlled that it will be a direct indication, when viewed with respect to the coordinates on the screen, of the temperature registered by the thermocouple selected by the selectors 53 on commutator disc 51.

For purpose of illustration there are only three thermocouples 65a, 65b and 65c shown diagrammatically. The conductors leading from the thermocouples are respectively connected to isolated pairs of commutator bars on the commutator disc 51. By means of the selector brushes 53 the thermocouple whose temperature is to be indicated is selected and electrical connection is made between commutator bars connected to the conductors of this thermocouple and slip rings 54 also carried by the commutator disc 51. The selector brushes 53 are secured to and adapted to rotate with the shaft 48 while the commutator disc 51 remains stationary.

The direct current voltage developed by the selected thermocouple appears across the slip rings 54. The negative slip ring is connected by conductor 66 to one terminal of the primary winding of a transformer 67. The other terminal of the primary winding of the transformer 67 is connected through conductor 68, a rectifier tube 69 and a conductor 70 to the sliding contactor 71 of the potentiometer 42. The resistance element 72 of potentiometer 42 is connected directly across the battery 73 through the conductors 74, the slip rings 75, brushes 76 and conductors 77. The positive terminal of the battery 73 is connected through conductor 78 to the positive slip ring of the commutator 51. With the thermocouple circuit arrangement just described, when the motor 39 makes one revolution the resistance element 72 of potentiometer 42 moves under the slide contactor 71 to control the voltage applied to the thermocouple circuit by the battery 73. When the voltage applied through the circuit of the rectifier tube 69 by battery 73 exceeds that of the thermocouple, a voltage is developed across the secondary of the transformer 67 which is applied to the grid of a gas triode tube 90. Such tubes are known in the art as "Thyratrons." The grid potential, supplied by battery 85, for the gas triode having been initially adjusted by the voltage divider 86 so that the tube will fire at any increase in grid potential, plate current will begin to flow through the conductor 87, the circuit making and breaking device 52, the conductor 89, resistance 88, resistance 79 and conductor 80.

Resistance 79 is connected directly across the battery 81 and serves as a voltage divider therefor. Since tap 83 on resistance 79 is connected through the conductor 82 to a ground that is common with the cathode 32 of the cathode-ray tube 31, and the end of resistance 88 to which conductor 89 is attached, is connected to the anode 34 of the tube 31 by conductor 84, a predetermined small negative voltage can be applied to the anode 34 to control the brightness of the cathode ray that is directed on the screen 38. The flow of plate current from the gas triode 90 through the resistance 88 develops an IR drop across that resistance which is applied as an additional negative voltage to the anode 34 through the conductors 82 and 84 to extinguish the cathode ray of tube 31. If, instead of connecting the resistance 88 directly to the positive terminal of the battery 81, it is connected to a variable tap on the battery more flexibility will be given to the circuit.

Commutator 50 is provided with a plurality of segments 121 equal in number to the number of thermocouples. The segments are insulated from each other except for connections between adjacent segments through resistance elements 116. This arrangement connects the resistance elements 116 in series and forms a large resistance which is connected across the battery 117. This resistance which is made up of the elements 116 can be cut out in steps by the contactor 49 that is driven by the shaft 48. The opposite end of contactor 49 engages a slip ring 118 that is fixed to the commutator 50 and insulated from the segments 121. By connecting one end of the vertical sweep coils 37 of the cathode-ray tube 31 to the slip ring 118 through conductor 119 and the other end of sweep coils 37 to a variable center tap on the battery 117, through conductor 120, the voltage applied to sweep coils 37 can be controlled in steps to raise or lower the cathode ray. The use of a variable center tap on battery 117 makes it possible to vertically adjust the point of light from the cathode ray on the screen 38.

Segments 91 of commutator 52 are separated from each other by insulation segments 92 which engage the contactor 93 as it passes from one of the segments 91 to an adjacent-like segment. Insulation segments 92 serve to break the plate circuit of the gas triode to reset it for the next cycle.

In operation, shaft 48, driven through the gear train 43 by shaft 40, which in turn is driven by the synchronized motor 39, drives contactors 49, 53 and 93 to respectively vertically position the spot of light from the cathode ray; selects the thermocouple whose temperature is to be indicated, and sets the gas triode for firing to extinguish the ray when it has moved horizontally across the screen to a point corresponding to the temperature of the thermocouple selected. While the contactors engage the selected segments on the respective commutators, potentiometers 41 and 42, each driven by shaft 40, make a complete revolution. Potentiometer 41 varies the voltage applied to the horizontal sweep coils 36 to cause the spot of light to move horizontally across the screen 38 and potentiometer 42 controls the bucking voltage that is applied by battery 73 to the selected thermocouple, which voltage when equal to and just exceeding the thermocouple voltage, through the gas triode 90, extinguishes the light spot at a point in its horizontal travel that indicates the temperature of the selected thermocouple.

The relationship between the bucking voltage supplied by the battery 73, that is controlled by potentiometer 42, and the thermocouple voltage is illustrated in Figure 5 in which curves representing each are plotted with voltage or electromotive force as ordinates and time as abscissa. The thermocouple voltage during the time that it is being scanned remains substantially constant and is represented by the dash line. The bucking voltage as supplied by battery 73, and controlled by potentiometer 42, varies from 0 to a maximum value as represented by the solid line. Obviously where the dash line crosses the solid line the two voltages are equal and this value of the varying voltage, as well as all values less than this value, will not fire the gas triode 90 when applied to the grid thereof, but any increase in the varying voltage over this value will induce a voltage in the secondary of transformer 67 which is connected in the grid circuit of the gas triode and will cause it to fire to extinguish the spot of light that is applied to the screen 38. This is further illustrated in Figure 6. In this figure the solid line represents the voltage induced by the secondary of the transformer during one revolution of potentiometer 42 and the hatched area represents the time during which the spot of light moves horizontally across screen 38 to indicate the thermocouple voltage. It can be seen that the spot is extinguished as the bucking voltage exceeds the thermocouple voltage.

In order that the indications of temperature will not appear on the screen 38 of the cathode-ray tube 31 as a moving spot of light a retention screen is used that will retain the light from the cathode ray for a period of time at least as long as that required to scan all the thermocouples. Screens of this type are available which will retain the light from a cathode ray for periods up to ten seconds. With such a screen the spot of light will trace a diagram that consists of horizontal light bars, the length of which will represent the temperatures of the scanned thermocouples. Such a diagram is illustrated on the left side of the screen 38. Since the screen has temperatures and position of thermocouple coordinates marked thereon, the right end of the light bars will indicate the temperatures registered by the thermocouples. The ends of these light bars therefore trace a curve which represents substantially instantaneous operating conditions in all zones of the regenerator.

This curve to be of greatest value to an observer should be readily comparable to a curve representing optimum operating conditions. Such a curve can be electronically or mechanically placed on the screen 38. To mechanically place such a curve on the screen it is necessary only to mark it on the coordinates by paint or other appropriate means or to provide a mask which outlines the optimum curve. Although a mechanically formed curve on the screen is practical it cannot readily be changed to suit varying operating conditions, such as a change in the rate of charge supplied to the reactor, which would necessitate a change in the operating conditions in the regenerator. Therefore, electronic means for placing the optimum operating characteristic curve on the screen are to be preferred since they are sufficiently flexible that the curve can be readily changed to meet any desired operating conditions.

Electronic means for simultaneously placing a curve on screen 38, which represents optimum operating conditions throughout the regenerator, are illustrated diagrammatically in Figure 7. Referring to this figure a plurality of condensers $C_3$, equal in number to the number of thermocouples whose temperatures are to be indicated, are separately connected in series with separate resistances $R_3$. These series resistance-capacity elements are connected in parallel and across the battery 102 by conductors 101 and 103. The rate at which the condensers will charge depends on the size of the resistances $R_3$. The negative plates of condensers $C_3$, the plates that are connected to the resistances $R_3$, are connected to separate segments of a commutator 105 through individual variable resistances $R_{10}$. The contactor 104 of the commutator 105 is driven by the shaft 48 to selectively engage the commutator segments. Contactor 104 is connected through conductor 95 to the positive plate of a condenser $C_5$. The negative plate of condenser $C_5$ is connected to the conductor 103, thereby completing a circuit whereby the condensers $C_3$ can successively charge the condenser $C_5$. Resistances $R_{10}$ are made variable so that the time required to charge condenser $C_5$ can be controlled. A gas filled diode tube 96 is connected in parallel with the condenser $C_5$ through a resistance $R_{20}$. When the charged potential of condenser $C_5$ increases to the breakdown potential of the diode tube the tube will become conductive and the condenser $C_5$ will discharge through the tube and its series resistance $R_{20}$. Tube 96 has a high breakdown voltage but low discharge voltage; therefore, the current passing through the resistance $R_{20}$ will be in the form of a pulse or transient. The IR drop developed across $R_{20}$ by the pulse of current can be applied as a positive voltage impulse to anode 34 of the cathode-ray tube 31 by connecting conductors 91 and 94 of Figure 7 to conductors 84 and 82 of Figure 4, respectively. If the cathode ray is extinguished at the time the voltage impulse is applied to the anode 34, it will flash on to give a bright dot of light on the screen, and if the cathode ray is already lit, it will flash brighter to give an outstanding bright dot on the screen.

Since the contactor 104 is driven by shaft 48 (see Figure 4) the variable resistances $R_{10}$ can be so adjusted that the bright dot will occur anywhere it is desired on the screen 38 as the spot of light is caused to horizontally traverse the screen.

In Figure 8 there is illustrated a type of control panel that can be used in conjunction with the variable resistances $R_{10}$. On this panel are shown a plurality of controls 98 for varying the resistances $R_{10}$ equal in number to the number of resistances. Each control has associated with it a scale 99 calibrated in temperature in degrees Fahrenheit (700°–1200°) and an indicator 100. By manipulating the controls 98, any desired optimum operating characteristic curve can be placed on the screen 38 simultaneously with a curve representing substantially instantaneous operating conditions in the regenerator.

The time constant of the resistance-capacity elements ($R_3$—$C_3$) in relation to the different resistance-capacities ($R_{10}$—$C_5$) is such that a second flash during the same cycle is prevented.

Where it is desired to reset the optimum curve which indicates the desired operating level in the regenerator, in accordance with space velocity, for example, an additional recorder capable of measuring space velocity biases the electronic circuits so that the optimum operating level curve is displaced as desired.

When it is desired to scan the thermocouples at extremely high speeds, for example, speeds that would give a persistent mosaic indication on the screen 38 without the use of a light retention screen, the potentiometers 41 and 42 and their associated batteries 56 and 73, respectively, can be replaced by cam-synchronized saw-toothed wave oscillators such as that illustrated by circuit diagram in Figure 9.

The use of a saw-toothed wave oscillator as a sweep circuit oscillator is well known in the art. The output conductors 115 and 106 of the oscillator are connected directly across the horizontal sweep coils 36 (Figure 4) of the cathode-ray tube 31 and the potentiometer 41 is replaced by a cam-operated switch 107. The cam 108 is mounted on shaft 40 and driven thereby.

In operation the gas triode tube 109 is biased beyond the point of cut-off by the battery 110 which supplies the grid potential. While this cut-off bias is applied to the grid of tube 109 the tube remains non-conductive, but when the cam, in its revolution, closes switch 107 a shunt circuit is created across the battery 110 thereby removing the bias potential from the tube 109. A resistance 111 is placed in series with the battery 110 to prevent short circuiting the battery by the shunt circuit. During the time when tube 109 is non-conductive the condenser 112 is being charged by battery 113 through the resistance 114. Battery 113 also provides the plate voltage for tube 109. The varying charged potential of condenser 112 will impress a varying voltage on the horizontal sweep coils 36 through the conductors 115 and 106. When the bias potential is removed from the grid of tube 109, by completing the shunt circuit, the tube becomes conductive and plate current will flow and as a result condenser 112 will quickly discharge through it. This has the effect of removing the sweep voltage from coils 36 and allows the cathode ray to return to its starting point where, on opening switch 107, it is ready to repeat the cycle. The rate at which the cathode-ray light spot is caused to move from left to right on the screen 38 can be controlled by varying the capacity of condenser 112 or its charging potential which is supplied by the battery 113. Due to the rapid discharge of condenser 113 when tube 109 becomes conductive the speed at which the light spot will move from right to left on the screen 38 will be so high as to make the light spot substantially invisible.

The output voltage wave of the oscillator, when plotted against time, will assume the shape of a saw-toothed curve. Due to the fact that the charge on condenser 112 is never allowed to approach full charge, its rate of charge is substantially linear resulting in a substantially linear voltage being applied to the horizontal sweep coils 36 during the period when it is being charged.

A similar oscillator circuit can be used to replace potentiometer 42 (Figure 4) and its associated battery 73 to provide a bucking voltage for the thermocouple voltage by merely connecting the output conductors 115 and 106 to the conductors 70 and 78 with the right polarity, and replacing the rotary element of the potentiometer 42 and its brushes by the cam 108 and cam-operated switch 107.

The light bars produced on the screen 38 to indicate substantially instantaneous operating conditions in the manner described above will have uniform width and light intensity. For numerous reasons it may be desirable to change the characteristics of particular light bars, for example, to indicate gradients of temperature, or to make the indication of the temperature in a particular zone outstanding on the indicator. This can be accomplished by varying the voltage applied to anode 34 (Figure 4) to increase or decrease the intensity of the cathode ray while certain light bars are being traced, or by applying an additional pulsating voltage to anode 34 to cause the cathode ray to trace a bar of light that will be a series of dots or dashes. This control is very flexible and can be varied in any way desired to produce light bars having the desired characteristics. It is obvious that such control can be made fully automatic by the addition of elements in the manner taught above.

Although this invention has been described in detail as applied to the indication of conditions existing in the regenerator of a "Thermofor" catalytic cracking unit, it has numerous other applications.

While in the specific example used, the variables plotted on the indicator screen were vertical height against temperature, it will be appreciated that pressure, velocity, time, acceleration, and differentials of time, temperature, or pressure may be employed with equal facility.

The necessary modifications to permit of these uses are believed to be within the purview of the invention here disclosed, and the invention is not to be limited by the specific discussion in the foregoing, but only by such limitations as are expressed in the claims.

I claim:

1. An electronic indicator for simultaneously indicating a plurality of temperatures, that comprises a cathode-ray tube, vertical and horizontal sweep circuit means for said cathode-ray tube giving a rectangular sweep pattern composed of parallel lines, a plurality of thermocouples, a commutator for sequentially selecting the electrical outputs of one after another of said thermocouples, means for coupling said commutator to said sweep circuit means so that it will select each thermocouple at the same time in each scanning operation, means for generating a voltage that changes progressively as each line of the pattern is scanned, an electrical circuit connecting the voltage generating means and selected thermocouple output in opposition, another electrical circuit coupled to said first electrical circuit and responsive to the variation of voltage from balance in one direction in said first electrical circuit, said second electrical circuit being connected to the intensity grid of said cathode-ray tube so as to change the potential of the intensity grid past the cut-off point in response to a change in voltage balance in the first electrical circuit.

2. An electronic indicator as defined in claim 1 in which the means for generating a voltage that changes progressively as each line of the pattern is scanned, is a means for generating a voltage that increases progressively as each line of the pattern is scanned.

3. An electronic indicator as defined in claim 1 in which the second electrical circuit is connected to the intensity grid of the cathode-ray tube so as to change the potential from a point above cut-off to a point below cut-off in response to a variation of voltage from balance in one direction in the first electrical circuit.

4. An electronic indicator as defined in claim 1 in which there is a rectifier in the first electrical circuit which prevents current flow in one direction.

5. An electronic indicator as defined in claim 1 in which the first electrical circuit is transformer-coupled to the second electrical circuit.

6. An electronic indicator as defined in claim 1 in which the second electrical circuit contains a thyratron relay.

7. An electronic indicator for simultaneously indicating a plurality of variable conditions existing in a continuous processing system, that comprises a cathode-ray tube, vertical and horizontal sweep circuit means for said cathode-ray tube giving a rectangular sweep pattern composed of parallel lines, a plurality of devices for producing electromotive forces proportional to each of the conditions which it is desired to indicate, a commutator for sequentially selecting the electrical outputs of one after another of said devices, means for coupling said commutator to said sweep circuit means so that it will select each device at the same time in each scanning operation, means for generating a voltage that changes progressively as each line of the pattern is scanned, an electrical circuit connecting the voltage generating means and selected device output in opposition, another electrical circuit coupled to said first electrical circuit and responsive to the variation of voltage from balance in one direction in said first electrical circuit, said second electrical circuit being connected to the intensity grid of said cathode-ray tube so as to change the potential of the intensity grid past the cut-off point in response to a change in voltage balance in the first electrical circuit.

CARLETON H. SCHLESMAN.

REFERENCES CITED

The following references are of record in the file of this patent:

UNITED STATES PATENTS

| Number | Name | Date |
|---|---|---|
| 1,887,827 | Uehling | Nov. 15, 1932 |
| 2,098,695 | Southwick | Nov. 9, 1937 |
| 2,110,746 | Tolson | Mar. 8, 1938 |
| 2,146,862 | Shumard | Feb. 14, 1939 |
| 2,225,046 | Hunter | Dec. 17, 1940 |
| 2,283,951 | Ripley | May 26, 1942 |
| 2,321,605 | Keinath | June 15, 1943 |
| 2,340,880 | Keinath | Feb. 8, 1944 |